United States Patent
Keller et al.

(10) Patent No.: US 6,555,153 B1
(45) Date of Patent: Apr. 29, 2003

(54) METHOD FOR PRODUCING EXTRUDED, PELLET PRODUCTS WITH MINIMAL TEMPERING TIME

(75) Inventors: Lewis Conrad Keller, McKinney, TX (US); Joseph William Kelly, Grapevine, TX (US); Nancy J. Moriarity, Richardson, TX (US)

(73) Assignee: RECOT, Inc., Pleasanton, CA (US)

( * ) Notice: Subject to any disclaimer, the term of this patent is extended or adjusted under 35 U.S.C. 154(b) by 0 days.

(21) Appl. No.: 10/171,727

(22) Filed: May 30, 2002

(51) Int. Cl.$^7$ ................................. A21D 6/00
(52) U.S. Cl. ................ 426/516; 426/242; 426/440; 426/448; 426/503
(58) Field of Search ............... 426/512, 516, 426/446, 448, 503, 440, 242

(56) References Cited

U.S. PATENT DOCUMENTS

| | | |
|---|---|---|
| 3,348,950 A | 10/1967 | Weiss |
| 3,615,675 A | 10/1971 | Wisdom et al. |
| 3,800,050 A * | 3/1974 | Popel ........................ 426/512 |
| 4,163,804 A | 8/1979 | Meyer et al. |
| 4,259,051 A | 3/1981 | Shatila |
| 4,262,028 A | 4/1981 | Meyer et al. |
| 5,132,127 A | 7/1992 | Wisdom |
| 5,645,872 A | 7/1997 | Funahashi |
| 5,750,170 A | 5/1998 | Daouse et al. |
| 6,165,530 A | 12/2000 | Mathew et al. |
| 6,224,933 B1 | 5/2001 | Bhaskar et al. |
| 6,242,034 B1 | 6/2001 | Bhaskar et al. |
| 6,328,550 B1 | 12/2001 | Sheen et al. |

* cited by examiner

*Primary Examiner*—George C. Yeung
(74) *Attorney, Agent, or Firm*—Colin P. Cahoon; Carstens, Yee & Cahoon, L.L.P.

(57) ABSTRACT

The method for producing extruded, farinaceous pellets includes extruding a mixture so that it expands upon exiting an extruder. This prepuffed ribbon is then subjected to stretching and cutting steps to produce pellets. The prepuffing reduces the moisture content of the ribbon so that cut pellets made from the ribbon can be immediately processed without the need for a moisture conditioning and/or dehydration step. In stretching, the extrudate ribbon is passed through a set of rollers to increase the extrudate ribbon's velocity thereby causing the ribbon to stretch. Stretching the extrudate ribbon causes a reduction in thickness along with an increase in density. After cutting, the pellets can then be expanded in a puffing stage to produce a product that has a desirable light and crunchy texture.

29 Claims, 1 Drawing Sheet

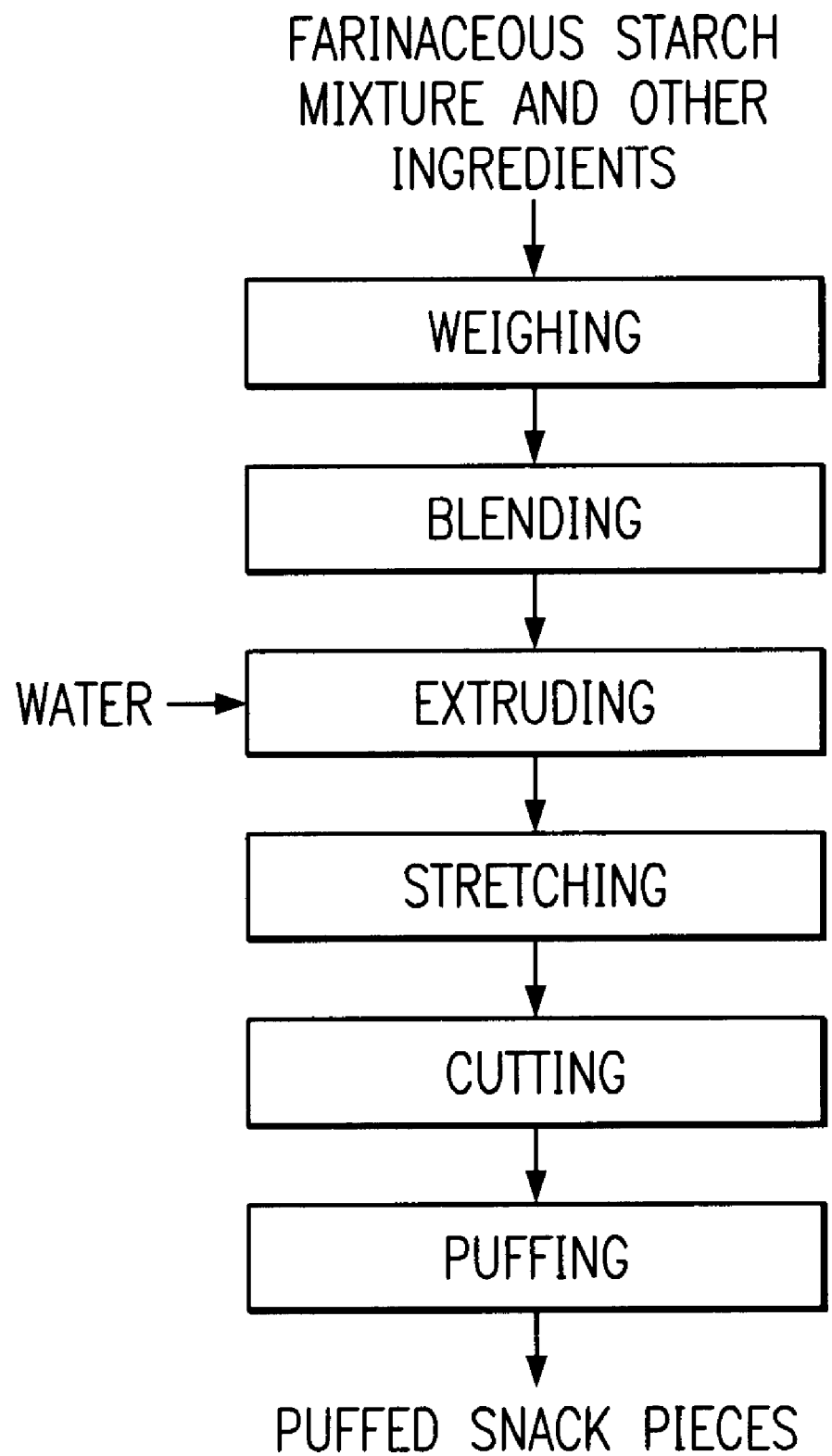

METHOD FOR PRODUCING EXTRUDED, PELLET PRODUCTS WITH MINIMAL TEMPERING TIME

BACKGROUND OF THE INVENTION

1. Technical Field

The present invention relates generally to a method for making extruded, pellet products with minimal tempering time prior to puffing. More particularly, the invention manipulates extrusion settings to produce a half-product that requires minimal drying and/or moisture equilibration prior to expansion by heating.

2. Description of Related Art

Pellet, or "half product" technology, is known in the snack industry for producing puffed snack products. Pellet products, prior to puffing (expansion), provide several advantages, which include the following: a high bulk density, which makes them less expensive to ship, breakage resistance during shipment, and the ability to form intricate shapes. Once puffed pellet products have a light, expanded texture because of their low product density and a thin product wall thickness, for example less than 0.20 inches.

Generally, an expandable pellet is one that increases in volume by upwards of 100% from the rapid vaporization of water within the pellet during rapid heating of the pellet. Consequently, the density of the pellet decreases. For example, the initial density of a typical pellet piece is greater than about 40 lb/ft3 and following expansion is reduced down to a final density of less than about 25 lb/ft3.

Typical pellets require processing to produce a finished snack product. In a first step, the ingredients, which generally include cereal products and starches, are hydrated to form an extrudable mixture for forming pellets. The extrudable mixture is subsequently gelatinized to create dough that is subsequently passed through a die where after the extruded mixture is cut into pellets. After formation, the unfinished pellets, which contain from about 20% to about 30% moisture by weight, are processed through a dryer to arrive at a final moisture of about 9% to about 18% for either storage or later processing after moisture equilibration.

To produce a product that has desirable texture, density and other characteristics, the pellets made using the prior art method need to be dried and moisture equilibrated, which is essentially a curing stage. This curing stage can extend from a period of less than an hour up to several days or longer. This step reduces the moisture content significantly from about 25% down to about 12% for example. Once dried, the pellets can then be expanded by heating with, for example, frying, baking (hot air impingement), or microwave heating. This drying/curing stage adds expense and time to the pellet manufacturing process.

Processes for producing pellets for use as a snack food product are known in the art. For example, U.S. Pat. No. 3,348,950 to Weiss describes a process for making snack food product by first mixing together corn, sucrose, water, and flavoring. This mixture is combined with a second mixture of yellow corn grits, water, and sodium bicarbonate. The combined mixture is pre-cooked under pressure of 14 psi to 20 psi and temperatures between 247° F. and 259° F. The gelatinized dough is shaped, and then dried and/or moisture equilibrated before puffing using deep-fat frying. This process requires extensive drying time and a tempering period of ½ to 2 hours.

Animal protein is known to be used for forming pellets. U.S. Pat. No. 4,163,804 to Meyer et al. describes producing expandable pellets by extruding animal parts at temperatures between 250° F. and 330° F. with an extrusion pressure over 500 psig. It is essential to this process that the raw material be animal parts that have a high average undenatured protein (collagen) content. The high collagen content allows the formation, under the disclosed process conditions to be formed after extrusion into a shaped sustaining form and cut into puffable pellets. It is disclosed that stretching ratios of from 2:1 to 5:1 are used in some applications of this invention but stretching is not used when annular shapes are made. No disclosure is made of required SME, die opening size, or stretching ratio as a means of eliminating the tempering step.

U.S. Pat. No. 4,262,028 to Meyer et al. includes adding starch to ground animal parts. Starch contents of up to 75% are disclosed, but the extrudate mixture still requires a high average collagen content of 25% of animal parts to form a thermoplastic moldable mass. Meyer discloses that the addition of starch makes it possible to obtain puffing of the product as it exits from the extruder. Meyer further states that this treatment can eliminate the need for additional drying of the product prior to any additional puffing in a fryer. However, such a product would no longer posses the beneficial pellet properties of high bulk density and resistance to breakage when shipping. Meyer does not disclose using any post-extrusion stretching to compress the prepuffed extrudate to densities and thicknesses in accordance with pellets.

U.S. Pat. No. 5,132,127 to Wisdom discloses a process for making a pellet product by combining a high moisture material with one or more low moisture farinaceous ingredients followed by extrusion. The extrudate in Wisdom is partially stretched by gravity at less than a 2:1 ratio over a several hour drying step that is required prior to frying or hot air puffing.

U.S. Pat. No. 6,165,530 to Mathew et al. and U.S. Pat. Nos. 6,224,933 and 6,242,034 to Bhaskar et al. describe processes to make pellets which involves using tension rolls to stretch a ribbon extruded from the die face. These stretching steps however are performed at less than a 2:1 ratio. Therefore, pellets manufactured by these processes still require a drying step prior to expansion.

Therefore, a method is needed for producing an extruded pellet without a drying/curing stage while maintaining desirable pellet density and expansion characteristics. Further, it is desired to have a pellet product that is less expensive and time consuming to manufacture than conventional pellet methods and does not require animal parts as an ingredient.

SUMMARY OF THE INVENTION

The present invention is an improved method for producing starch-based, or other farinaceous-based pellets that after expansion have a light, expanded texture. The expansion of the pellets made from with this method do not require a prior dehydration/tempering step. The primary raw material of the pellets is a farinaceous starch mixture with no animal parts or collagen sources required. This includes yellow corn meal, white corn meal, corn masa flour, rice meal, wheat flour, oat flour, and/or mixtures thereof. Other ingredients can include sucrose, dextrose, dry molasses, wheat bran, modified food starches, leavening, shortening, vegetable protein, and emulsifier. These ingredients are added by weight to a blender for dry mixing. Thereafter, this mixture is fed to an extruder along with water and/or steam for hydration.

During extrusion, the mixture is mechanically sheared and gelatinized within the extruder under conditions of shear, pressure, and temperature to form an extrudate. Upon passing through a die, the extrudate forms a ribbon, which "prepuffs" upon exiting the extruder due to steam being released from the reduction in pressure. This prepuffing facilitates a reduction in the moisture content of the ribbon from about 15% to about 30% down to about 9% to about 20%.

To convert the prepuffed ribbon to an unpuffed pellet consistency, the ribbon is stretched by passing it through, for example, a series of rollers. The tension in the ribbon, provided by the stretching rollers, counteracts the expansion caused by the prepuffing at the die due to steam formation. This results in the ribbon, after initially expanding, to return to an unexpanded, thin pellet like nature with a density greater than about 40 lb/ft3 and a thickness of less than about 0.10 inches.

Particularly with the stretching, the stretching rollers have a rotational velocity that exceeds the ribbon's linear velocity. The rollers apply a light pressure sufficient to grab the ribbon causing it to stretch without substantially creating a calendering effect. The stretched ribbon's velocity is thereby increased to at least two times (2:1) or more, preferably at least three times (3:1) or more, the velocity it had when it exited the extruder. The stretched ribbon is then cut by a roll cutter or alternative cutting device into preform chip pieces, i.e., pellets, for subsequent expansion (puffing) by heating with frying, hot-air popping, or microwaving.

After puffing, the finished product has a volume significantly greater, such as twice, that of the pellet's volume and a density significantly lower, such as at least one half, that of the pellet's density. Also, the finished product has another benefit of shape retention of the die insert's orifice. The finished product has a light, expanded, and appetizing texture that is characteristic of expanded, pellet products. Further, the finished product can be made without the need for a time consuming pellet dehydrating and/or conditioning stage prior to expansion.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawing, wherein:

FIG. 1 is a schematic block diagram illustrating an exemplary process in accordance with the present intention.

DETAILED DESCRIPTION

Applicants' invention is a process for making expandable pellets that produce a finished, puffed product with a light texture and an appetizing quality. FIG. 1 shows a schematic block diagram illustrating an exemplary process for making expandable pellets. The primary raw material of the pellets is a farinaceous starch mixture which can include yellow corn meal, white corn meal, corn masa flour, rice meal, wheat flour, oat flour, and/or mixtures thereof. Other ingredients can include sucrose, dextrose, dry molasses, wheat bran, modified food starches, leavening, shortening, and emulsifier. A protein, such as soy protein, can also be substituted, at least in part, for some of the meal but is not required. No animal parts, or sources of collagen, are needed for this invention. Furthermore, the farinaceous mixture contains less than about 25% of animal parts, or sources of collagen.

The dry ingredients are first added by weight to a mixer such as a ribbon blender for dry mixing. After being blended, the mixture is fed to an extruder along with water and/or steam for hydration. A preconditioner (not shown), or other apparatus may also be used to prehydrate and/or precook the mixture prior to the mixture being fed to an extruder.

Therefore, the mixture is mechanically sheared and cooked within the extruder. Upon passing through a die, the extrudate forms a ribbon, which expands, or "prepuffs," upon exposure to air. This prepuffing results from a sudden drop in pressure that is experienced by the superheated material, which, for example, is at a temperature greater than about 220° F. The steam released at the die reduces the moisture content of the ribbon from about 15% to about 30% down to about 9% to 20%. Because conventional pellet processing is done at temperatures below 220° F., there is minimal steam flashing at the die and little reduction in moisture content for conventional pellets. Thus, in conventional pellet processing subsequent drying is necessary to reduce the moisture to a range conducive to subsequent puffing, which is at a moisture of about 9% to about 18%.

In this invention, however, the prepuffing at the die decreases the moisture content, which thereby avoids a conventional dehydration step. Consequently, this prepuffing also increases the ribbon thickness and decrease the density, for example, by over about 0.1 inches and about 50 lb/ft$^3$ or less, respectively. If no subsequent processing were done, the product at this point would not have the nature of a pellet.

The properties of a pellet that are desired include the pellet being able to expand to about twice its volume while maintaining a desirably thin wall thickness of less than about 0.2 inches and relatively high product density. To convert the ribbon to a pellet consistency, the ribbon is stretched by passing it through a series of rollers or opposing belts.

To achieve stretching, the rollers or belts have a rotational velocity that exceeds the ribbon's linear velocity. The rollers, for example, apply a light pressure sufficient to grab the ribbon to cause it to stretch from the sudden increase in velocity. This is achieved without creating a calendering effect. The stretched ribbon's velocity is thereby increased to at least twice the velocity it had from the extruder, i.e., a ratio of about 2:1, more preferably at least three times, i.e., a ratio of about 3:1. The stretched ribbon is then cut into individual pellets (pieces) by, for example, a roll cutter.

The pellets are then finished (puffed) by expanding them in a fryer or hot air popper for example or, alternatively, the pieces can be processed and packaged for later expansion. The finished puffed product has a volume significantly greater than a pellet's volume. For example, the puffed product has a volume approximately twice as large as the pellet's. The puffed product's density is significantly lower than the pellets, for example, a density less than about 25 lb/ft$^3$. For example, the density of the puffed product is decreased by about half that of the pellet, which has a density of greater than about 40 lb/ft$^3$ for example. The puffed product has a light, crunchy, texture like that of a conventional pellet product.

TABLE 1 lists approximate proportions of respective ingredients used in the exemplary process of FIG. 1. For weighing, the farinaceous starch mixture such as those listed above, can be provided by a bulk system. The farinaceous mixture is then mixed with minor ingredients such as those listed above. The minor ingredients can be provided by a component system after weighing. The bulk and component systems comprise a way for storing, weighing, and transferring the ingredients. The product mixture is then mixed in a ribbon blender to assure sufficient blending of the ingredients, which for example can occur after about one to two minutes.

TABLE 1

|  | Range | Preference |
| --- | --- | --- |
| Wheat Flour | 0–100% | 45.5% |
| Rice Flour | 0–100% | 45.50% |
| Sucrose | 0–10% | 5.5% |
| Wheat Bran | 0–10% | 3.0% |
| Emulsifier | 0–1% | 0.5% |

After blending the ingredients are fed to an extruder via a screw feeder. Along with the dry ingredients, water is added into the extruder with the mixture for hydration. The extruder can be a twin screw extruder such as an APV Baker BP50 or a Cextral BC45, or a single screw extruder, or any means of mixing, heating, and forming the mixture into a dough and extruding it through a die orifice. The mixture can be prehydrated and/or precooked, prior to being fed to the extruder, by any of many conventional means, including a preconditioner as stated above.

The extruder preferably has multiple zones wherein the zones can provide heating or cooling as needed. Once in operation the shearing in the extruder imparts energy into the material producing heat and causing physical changes in the mixture. Conventional extrusion cooking imparts about 90 W-hr/kg to about 150 W-hr/kg to the extruded material of Specific Mechanical Energy (SME). In the instant process, SME's of less than about 90 W-hr/kg, and more preferably less than about 50 W-hr/kg, are imparted to the material. With reduced SME's, excessive prepuffing is avoided.

The extruder temperature is set to about 280° F. to about 320° F., more preferably about 300° F. This results in an extrudate temperature at the die exit of about 245° F. to about 320° F., more preferably about 275° F. to about 300° F. A temperature within this range assures a thorough cooking of the ingredients wherein the mixture will gelatinize thereby opening the starch granules. Extrusion temperatures in excess of 320° F. result in excessive prepuffing at the die. Excessive prepuffing is when the ribbon expands to such a level, that even stretching the ribbon to its breaking point, which is at about greater than the ratio of 3:1 for example, will not result in the ribbon being compressed to a density and thickness of a pellet.

At the extruder exit, the extrudate is passed through a die, which, for example, has orifice dimensions of about 0.032×2 inches to form a ribbon or sheet. The height of the orifice can range from about 0.015 inches to about 0.060 inches, more preferably from about 0.025 inches to about 0.045 inches. Orifices thinner than 0.015 inches in height will result in excessive pressure which will result in excess prepuffing. Thicker orifices of about greater than about 0.060 inches in height result in a pellet which is too thick, which is at about a thickness greater than of about 0.070 inches, for proper expansion. A pellet thickness less than about 0.070 inches in height is desired so that the entire pellet can be rapidly brought to a temperature where expansion occurs. If pellets are too thick, they will not expand uniformly and will not have optimum texture. For example, an overly thick ribbon, such as that which could be produced with an orifice over 0.060 inches in height, cannot simply be stretched to reduce its thickness for proper puffing. This is because the ribbon will be stretched past its breaking point.

With regard to extrusion pressure, it is preferred that the pressure be maintained under about 1000 psi so that the stretching of the ribbon can return it to a consistency of a pellet. More preferably the pressure is maintained under about 750 psi, and even more preferably under about 500 psi. For example, extrudate ribbon produced, under these operating conditions exits the die at a velocity of about 5 fpm (feet/min) to about 40 fpm, more preferably about 10 fpm, with a moisture content of about 20% to about 25%. Upon exiting the die, the extrudate expands resulting in an increased volume and a decreased density. Thereafter, the extrudate is stretched at least in part to avoid a conventional pellet dehydration and/or conditioning step.

With conventional pellet processes, extrudate is cut and then allowed to dehydrate to a moisture content of about 8% to about 15%, for example. This is needed to avoid producing a thick and hard final puffed product in the puffing stage. With moisture loss during prepuffing and then stretching the extrudate to pellet consistency, dehydration and/or conditioning of the pellets is substantially avoided which results in a shorter and less expensive process.

A stretching assembly comprises a set of rollers that grab the extrudate and cause it to stretch. The space between the rollers is slightly smaller than the width of the extrudate ribbon. Whereby, the ribbon is grasped without applying significant compression to avoid a calendering effect. It is believed that the stretching causes the starch molecules of the mixture to become substantially aligned in the direction of the traveling ribbon, which provides the finished products' desired texture. As stated previously, stretching assembly increases the linear velocity of the ribbon. For example when the extruded ribbon speed was between 5 fpm and 40 fpm, the stretched velocity in one embodiment was about 15 fpm to about 80 fpm, more preferably about 24 fpm. Advantageously, the stretched ribbon has a memory for the shape of the die insert orifice through which it passed. Therefore after stretching, the flattened ribbon will rebound and assume a general shape of the die insert upon puffing into a finished product. For example, if the orifice has a wavy shape then the puffed pieces will resemble the wavy shape of the orifice.

The stretched ribbon is then fed to a cutter for cutting the ribbon into shaped pellets, which include for example flat or wavy rectangles. The cutter comprises a roll cutting assembly wherein one roller has a rotating cutting blade and the other roller is an anvil roller. The stretched ribbon is fed through the rollers and is cut into pellets. Thereafter, the pellets can be passed along for puffing immediately without the need for additional dehydration and/or moisture equilibration. Alternatively, the pellets can be stored for later cooking with minimal or no dehydration.

EXAMPLE

A dry feed of base materials is added to and mixed in a ribbon blender. The dry feed comprises the following: 45.5% wheat flour, 45.5% rice flour, 5.5% sucrose, 3% wheat bran, 0.5% Dimodan ESK emulsifier from Danisco. The dry feed is mixed at 500 RPM in the ribbon blender to sufficiently mix the ingredients prior to being fed to the extruder, about one to two minutes.

The mixed dry feed is volumetrically fed by a screw feeder to a twin screw extruder. The main drive of the extruder rotates at about 125 RPM, which produces an extruder velocity of about 8 fpm and an SME of 20 W-hr/kg. Water is added to the dry mixture as it is fed into the extruder at a rate of about 7 lb/hr to form a dough moisture of about 22%. The pressure in the extruder applied to the extrudate is about 175 psi. The extruder temperature is about 300° F. which causes the extrudate to increase in temperature from 80° F. up to a temperature of 280° F. at the exit of the extruder. The extrudate is forced through a die at the exit of the extruder. The die has orifice dimensions of 0.032 inches×2 inches. The extrudate upon reaching atmospheric conditions expands and moisture is released from the extrudate to result in a pellet moisture of about 18%. This ribbon of material is then fed through rollers for stretching The rollers are rotating at about three times that of the extruder velocity, which is about 24 fpm. The ribbon is fed between the rollers causing the ribbon, which has expanded to a thickness of 0.10 inches and a density of 55 lb/ft$^3$, to stretch and compress to a thickness of 0.027 inches and increase in density to about 82 lb/ft$^3$. The stretched ribbon is then passed through a roll cutter for cutting the within into individual pellet chips. The cutter chip area is 3.74 square inches with a corner radius of about 0.25 inches.

Pellets manufactured in accordance with the above-described features are capable, upon puffing, of assuming the desirable light and crunchy texture of a puffed chip without the need of a conditioning step for moisture dehydration or equilibration prior to puffing. Thereby, the invention allows for a shorter and less expensive process. Further, these pellets are capable of being made with interesting textures and/or shapes depending on the die's shape used in extrusion.

While the invention has been particularly shown and described with reference to a preferred embodiment, it will be understood by those skilled in the art that various changes in form and detail may be made therein without departing from the spirit and scope of the invention.

What is claimed is:

1. A method for producing extruded pellets, comprising:
   providing a farinaceous source;
   adding water to the farinaceous source to form a mixture;
   extruding the mixture wherein the mixture attains a superheated temperature and expands upon exiting the extruder to produce an extrudate ribbon with a first velocity;
   stretching the extrudate ribbon whereby the first velocity is increased by at least two times to a second velocity; and
   forming pellets from the stretched ribbon.

2. The method of claim 1 wherein the second velocity is at least three times greater than the first velocity.

3. The method of claim 1 wherein the first velocity is between about 5 fpm and about 40 fpm and the second velocity is between about 15 fpm and about 80 fpm.

4. The method of claim 1 wherein the moisture content of the mixture in the extruder is from about 20% to about 25%.

5. The method of claim 1 wherein adding water to the mixture includes preconditioning.

6. The method of claim 1 wherein the forming of the pellets further comprises cutting the stretched extrudate ribbon into discrete shapes.

7. The method of claim 1 wherein the pellets are not substantially dehydrated or conditioned prior to being expanded into snack pieces.

8. The method of claim 1 further comprising expanding the pellets into snack pieces by heating.

9. The method of claim 8 wherein the expanded pellets assume a shape similar to that of a die orifice of the extruder used in the extruding.

10. The method of claim 8 wherein the heating is either by frying, hot-air popping, or microwaving.

11. The method of claim 1 wherein the stretching is produced by passing the extrudate ribbon through one or more sets of rollers or belts.

12. The method of claim 9 wherein the stretching is accomplished without substantially calendering the extrudate ribbon.

13. The method of claim 1 wherein the providing of the farinaceous source comprises
   providing a primary raw material of yellow corn meal, white corn meal, corn masa flour, rice flour, wheat flour, oat flour, or mixtures thereof; and
   providing additional raw material of dry molasses, wheat bran, modified food starches, leavening, shortening, sucrose, dextrose, soy protein, emulsifier, or mixtures thereof.

14. The method of claim 1 wherein an SME (Specific Mechanical Energy) of extrusion is less than about 90 W-hr/kg.

15. The method of claim 14 wherein the SME (Specific Mechanical Energy) of extrusion is less than about 50 W-hr/kg.

16. The method of claim 1 wherein extruding the mixture is at an extrusion pressure less than about 1000 psi.

17. The method of claim 16 wherein the extrusion pressure is less than about 750 psi.

18. The method of claim 17 wherein the extrusion pressure is less than about 500 psi.

19. The method of claim 1 wherein the attained temperature of the extruded mixture is between 245° F. and 320° F.

20. The method of claim 19 wherein the attained temperature of the extruded mixture is between 275° F. and 300° F.

21. The method of claim 1 wherein the extruded mixture is passed through a die orifice gap height of between about 0.015 inches to about 0.060 inches.

22. The method of claim 21 wherein the extruded mixture is passed through the die orifice gap height of between about 0.025 inches and about 0.045 inches.

23. The method of claim 1 wherein the formed pellets have a density of greater than about 40 lb/ft$^3$.

24. The method of claim 23 wherein the formed pellets have a density of greater than about 60 lb/ft$^3$.

25. The method of claim 1 wherein the formed pellets have a thickness less than about 0.10 inches.

26. The method of claim 25 wherein the formed pellets have a thickness less than about 0.070 inches.

27. The method of claim 1 wherein the formed pellets have a thickness less than about 0.050 inches.

28. A method for producing extruded pellets, comprising:
   providing a farinaceous source containing less than about 25% animal parts or collagen sources;
   adding water to the farinaceous source to form a mixture;
   extruding the mixture wherein the mixture attains a superheated temperature and expands upon exiting the extruder to produce an extrudate ribbon with a first velocity;
   stretching the extrudate ribbon whereby the first velocity is increased by at least two times to a second velocity; and
   forming pellets from the stretched ribbon.

29. A method for producing extruded pellets, comprising:
   providing a farinaceous source;
   adding water to the farinaceous source to form a mixture;
   extruding the mixture wherein the mixture attains a superheated temperature and expands upon exiting the extruder to produce an extrudate ribbon with a first velocity;

stretching the extrudate ribbon whereby the first velocity is increased by at least two times to a second velocity; and forming pellets from the stretched ribbon wherein the pellets have a density of more than about 40 lb/ft$^3$, a thickness of less than about 0.10 inches, a moisture content of between about 9% and about 20%, which can be expanded into a snack piece with a density of less than 25 lb/ft$^3$.

* * * * *